United States Patent Office 3,338,895
Patented Aug. 29, 1967

3,338,895
N-(CYCLIC AMINO)PHENOTHIAZINE-10-CARBOXAMIDES
Harman S. Lowrie, Glenview, Ill., assignor to G. D. Searle & Co., Chicago, Ill., a corporation of Delaware
No Drawing. Filed Nov. 6, 1964, Ser. No. 409,588
3 Claims. (Cl. 260—243)

The present invention relates to a group of semicarbazides which contain both a phenothiazine group and a N-amino(cyclic amine) group. More particularly, it relates to a group of compounds having the following general formula

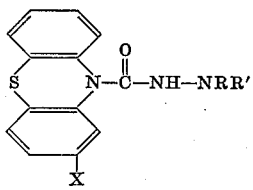

wherein X is selected from the group consisting of hydrogen and chlorine and —NRR' is selected from the group consisting of piperidino, hexamethylenimino, morpholino and 4-methyl-1-piperazinyl.

The compounds of this invention are useful because of their pharmacological properties. Thus, they possess activity as pepsin inhibitors, antiulcer agents, and diuretics. In addition, they possess antibiotic activity against a number of organisms. That is, they inhibit the growth of algae such as *Chlorella vulgaris* and protozoa such as *Tetrahymena gelleii*. Those compounds wherein —NRR' is 4-methyl-1-piperazinyl are particularly useful because of the indicated antibiotic activity.

The compounds of the present invention are conveniently prepared by the reaction of a phenothiazine-10-carbonyl chloride with the appropriate N-amino(cyclic amine). The reaction is conveniently carried out in an inert solvent in the presence of a tertiary amine. The tertiary amine is used to react with the hydrogen chloride formed in the reaction. Triethylamine is one example of an amine useful for this purpose. Among the inert solvents which can be used in this reaction are halogenated hydrocarbons. One example of such a useful solvent is methylene chloride.

The following examples are presented to further illustrate the present invention; they should not be construed as limiting it in spirit or in scope. In these examples, quantities are indicated in parts by weight and temperatures in degrees centigrade (° C.).

Example 1

To a solution of 7.9 parts of phenothiazine-10-carbonyl chloride in 270 parts of methylene chloride there is added, dropwise with stirring at room temperature, a solution of 3.5 parts of 1-amino-4-methylpiperazine and 4 parts of triethylamine in 65 parts of methylene chloride. The resultant solution is allowed to stand for 15 hours at 25° C. and then further diluted with methylene chloride. The solution is then washed with diluted potassium carbonate solution and dried, first by shaking with saturated sodium chloride solution, and then with anhydrous potassium carbonate. The solvent is then evaporated under reduced pressure and the resultant residue is dissolved in anhydrous ether and washed first with dilute potassium hydroxide solution and then with water. The ether solution is extracted with dilute hydrochloric acid and the combined acid extracts are made alkaline and extracted with ether. The resultant ether solution is dried, concentrated, and cooled to 0° C. A yellow powder precipitates and it is separated and recrystallized from ether after treatment with charcoal. The product, obtained as white microprisms, is N-(4-methyl-1-piperazinyl)phenothiazine-10-carboxamide melting at about 156–157° C. This compound has the following formula

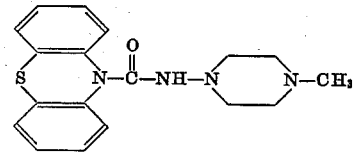

Example 2

An equivalent quantity of 2-chlorophenothiazine-10-carbonyl chloride is substituted for the phenothiazine-10-carbonyl chloride and the procedure of Example 1 is repeated. The product is obtained as white prisms by the addition of hexane to the final concentrated ether solution. It is N-(4-methyl-1-piperazinyl)-2-chlorophenothiazine-10-carboxamide melting at about 160–162° C.

Example 3

1-aminohexamethylenimine is reacted with phenothiazine-10-carbonyl chloride according to the procedure described in Example 1. In this case, the product oiled out of the final ether solution when hexane was added but the oil solidified on standing. The solid was then separated and recrystallized from a mixture of methanol and water to give white microcrystals of N-hexamethyleniminophenothiazine-10-carboxamide melting at about 114–116° C.

Example 4

1-aminopiperidine is reacted with phenothiazine-10-carbonyl chloride according to the procedure described in Example 1. The product is recrystallized from ether to give white microprisms of N-piperidinophenothiazine-10-carboxamide melting at about 152–154° C. with decomposition. This compound has the following formula

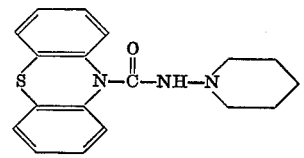

Example 5

An equivalent quantity of 4-aminomorpholine is reacted with phenothiazine-10-carbonyl chloride according to the procedure described in Example 1. In this case, the residue obtained after evaporation of the solvent from the methylene chloride solution is dissolved in ether. The ether solution is extracted first with dilute hydrochloric acid and then washed with dilute potassium hydroxide solution and dried. The ether solution is concentrated and hexane is added to give yellow needle-clusters of N-morpholinophenothiazine-10-carboxamide melting at about 143–145° C. This compound has the following formula

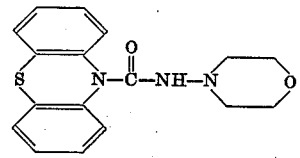

Example 6

4-aminomorpholine is reacted with 2-chlorophenothiazine-10-carbonyl chloride according to the procedure described in Example 1. The crude product is recrystallized from ether to give white microprisms of N-morpholino-2-chlorophenothiazine-10-carboxamide melting at about 163–164° C.

What is claimed is:
1. N-(4-methyl-1-piperazinyl)phenothiazine-10-carboxamide.
2. N-(4-methyl-1-piperazinyl)-2-chlorophenothiazine-10-carboxamide.
3. N-morpholino-2-chlorophenothiazine-10-carboxamide.

References Cited

UNITED STATES PATENTS 3,248,384  5/1966  Aumuller et al. _____ 260—243

OTHER REFERENCES

Bianchi et al., Gastroenterology, vol. 47, No. 4, pp. 409–414 (1964).

Levey et al., Gastroenterology, vol. 27, pp. 625–628 (1954).

WALTER A. MODANCE, *Primary Examiner.*

HARRY I. MOATZ, *Assistant Examiner.*